United States Patent Office 3,764,385
Patented Oct. 9, 1973

3,764,385
ELECTRIC BATTERY USING COMPLEXED INORGANIC LITHIUM SALTS AS CHARGE TRANSFER AGENT
Arthur W. Langer, Jr., Watchung, and Thomas A. Whitney, Linden, N.J., assignors to Esso Research and Engineering Company
No Drawing. Continuation-in-part of application Ser. No. 808,328, Mar. 18, 1969. This application Dec. 22, 1970, Ser. No. 100,813
Int. Cl. H01m 29/00, 43/00
U.S. Cl. 136—6 R    16 Claims

ABSTRACT OF THE DISCLOSURE

An electric battery which is characterized by use therein of a complexed inorganic lithium salt as the charge transfer agent between the electrodes. The electric battery can be a primary or a secondary electrical energy storage device, and in a preferred embodiment the complexed lithium salt is dissolved in an aromatic solvent.

CROSS REFERENCE TO RELATED APPLICATIONS

This case is a continuation-in-part of U.S. application Ser. No. 808,328, filed on Mar. 18, 1969, in the names of Arthur W. Langer, Jr. and Thomas A. Whitney.

BACKGROUND OF THE INVENTION (1) Field of the invention

This invention relates to an electric battery which is characterized by use therein of a complexed inorganic lithium salt as the charge transfer agent between the electrodes. The electric battery can be a primary or a secondary electrical energy storage device, and in a preferred embodiment the complexed lithium salt is dissolved in an aromatic solvent.

(2) Prior art

It is desirable to achieve maximum energy density (watt hrs./lb.) and maximum current density (watts./lb.) in an electric battery. Since one of the large contributors to the weight of a battery is the charge transfer agent, it has been deemed desirable to substitute lower density organic solutions for the aqueous solutions primarily used.

Another advantage of using organic solutions as the charge transfer agent is that certain desirable electrode materials can be utilized. For example, Li, which is theoretically capable of the highest energy density of all the anodic materials, cannot be used with an aqueous charge transfer agent because of its inherent instability in water and other aprotic media. The organic solutions which have been used fall into two categories, each with its own disadvantages.

In Electrochemical Technology, vol. 6, No. 1–2, January–February 1968, pp. 28–35, a series of electric batteries are described which are capable of yielding high energy densities. These batteries utilize a lithium anode, a charge transfer medium comprising $LiClO_4$ or $LiAlCl_4$ dissolved in a solvent selected from the group consisting of acetonitrile, dimethyl formamide, propionitrile, dimethyl sulfoxide, methylacetate, 4-butyrolactone, nitro methane, 2-pentanone, propylene carbonate and dimethyl carbonate, and a AgCl cathode. Various problems with these systems are encountered due to the tendency of the solvent to undergo oxidation and reduction reactions during battery use. Further, the more effective solvents of this series, i.e., propylene carbonate, dimethylformamide, dimethyl sulfoxide, and similar solvents such as hexamethylphosphoramide are expensive. Batteries which also utilize these solvents are described in U.S. Pat. No. 3,514,337. These batteries suffer from the same disadvantages.

It is also known in the art that it is possible to achieve a high energy density electric battery by utilizing Li or Al anodes with a charge transfer agent comprising Li salts in either their molten or solid state. These batteries have been described in U.S. Pats. 3,445,288; 3,506,490; and 3,506,492. All the batteries so described must be operated at temperatures in excess of 250° C.

A new approach to designing a high energy density battery has been described in U.S. Pat. No. 3,404,042. The batteries described therein represent an improvement over the prior art.

SUMMARY OF THE INVENTION

Novel batteries are described herein which are not subject to the problems encountered in the prior art. More specifically, the electric batteries of the instant invention achieve high energy densities by utilizing as a charge transfer agent a complex of an inorganic lithium salt and a monomeric or polymeric polyfunctional Lewis base.

The first component of the charge transfer agent of this invention is an inorganic lithium salt having a lattice energy no greater than about that of lithium hydride, preferably no greater than about 210 kilocalories per mole (measured at about 18° C.). The lattice energies of various inorganic lithium salts may be found in the "Handbook of Electrochemical Constants" by Roger Parsons (Academic Press, 1959).

The lithium salts useful for this invention must have less than the requisite maximum lattice energy and must also be inorganic in nature; they will normally have melting points less than about 650° C. The term "inorganic," for the purposes of this invention, means that (1) there is no hydrocarbon radical bonded directly to the lithium atom and (2) any hydrocarbon radical present in the anion moiety must be indirectly bonded to the lithium through a third atom which cannot be nitrogen, oxygen, phosphorus or sulfur. Thus, lithium compounds such as n-butyllithium and phenyllithium do not meet criteria (1) and are outside the scope of this invention. Similarly, compounds of the type LiOR, LiNHR or $LiNR_2$, LiSR, $LiPR_2$, LiOOCR do not meet criteria (2) and are therefore outside the scope of this invention. On the other hand, compounds of the type $LiNH_2$, LiCN, LiSCN, LiSH, $Li_2CO_3$, $LiHCO_3$, $LiAlR_2Cl_2$, $LiAlH(OR)_3$, $LiBH(OR_3)$, $LiAlR_3H$, etc. are within the scope of this invention.

Specific nonlimiting examples of useful inorganic lithium salts are those in which the anion is: amide, azide, chlorate, cyanide, fluosulfonate, chloride, bromide or iodide, hydrogen sulfate, hydrosulfide, iodate, nitrate, hypochlorite, nitrite, sulfate, thiocyanate, perchlorate, $Br_3$, $I_3$, $ClBr_2$, $IBr_2$, $ICl_4$, $BrF_4$, $IF_6$, etc.

Also useful are those inorganic lithium salts in which the anion is a complex metal anion which may be represented by the formula $R''_nMX_m$ wherein $n$ is an integer of 0 to 6 inclusive depending on the valence of M, $m$ is an integer and $(n+m-1)$ equals the valence of M, X is a halogen, R'' is a $C_1$–$C_{20}$ alkyl, aryl or aralkyl radical and M is a metal selected from the group consisting of beryllium, magnesium, Group I–B elements, Group II–B elements, Group III elements, Group IV–A elements other than carbon and silicon, Group V–A elements other than nitrogen; and the transition metals, i.e. subgroup B of Groups IV through VIII. The Periodic Table employed in describing this invention is that which appears on the back cover of "Handbook of Chemistry and Physics" (Chemical Rubber Co., 49th Edition).

Nonlimiting examples of useful complex metal anions include the hydridoaluminates, the hydridoborates, the chloroaluminates (tetra-, hepta-, etc.), the aluminum alkyl halides $AuBr_4$, $BF_4$, $BeCl_4$, $SnCl_6$, $PF_6$, $TiCl_6$, $FeCl_4$, $Cr(CO)_5I$, $MnCl_3$, $Ni(CN)_4$, $VF_6$, $HgCl_3$, $B_2H_7$, $UF_4$, $AsF_6$, etc.

Preferably, the inorganic lithium salt is one of the following: lithium chloride, lithium bromide, lithium iodide, lithium aluminum hydride, lithium borohydride, lithium nitrate, lithium nitrite, lithium hexafluorophosphate, lithium tetrafluoborate, lithium tetraphenylborate, $$LiAl(C_2H_5)H_3, \; LiAl(C_2H_5)_2H_2, \; LiAl(C_2H_5)_3H,$$
$$LiAl(C_2H_5)_4,$$

lithium perchlorate, lithium azide, $LiAsF_6$, and $Li_2BeF_4$.

The most preferred inorganic lithium salts are LiBr, LiI, $LiBH_4$, $LiAlH_4$, $LiBF_4$, and combinations thereof.

The complexing agent contains at least two functionalities; at least one functionality is a secondary amine group, a tertiary amine group, an amine oxide group, a secondary phosphine group, a thioether group, a sulfone group or a sulfoxide group; at least one other functionality is a secondary amine group, a tertiary amine group, a secondary phosphine group, a tertiary phosphine group, a thioether group, or an ether group.

The terms "amine oxide group" and "phosphine oxide group," for the purposes of this invention mean that the underlying amine and phosphine must be tertiary (rather than primary or secondary) in nature. Thus, the desired "amine oxide group" and "phosphine oxide group" have the formulas:

$$R-\overset{O}{\underset{R}{N}}-R \quad \text{and} \quad R-\overset{O}{\underset{R}{N}}-R$$

The oxides of primary or secondary amines or phosphines either do not exist or are unstable and undergo rearrangement, e.g.

$$R-\overset{O}{\underset{R}{N}}H \longrightarrow R-\overset{OH}{\underset{R}{N}}$$

The complexing agent may be non-chelating or chelating in nature; the chelating types (preferred herein) have one required functionality in a spatial relationship with the other required functionality(ies) in the molecule such that coordinate bonds are established between the functionalities and the lithium cation of the inorganic lithium salt.

Suitable, nonlimiting examples of nonchelating complexing agents are:

amines such as triethylenediamine, tetramethyl-1,6-hexanediamine, N,N'-dimethylpiperazine, tetramethyl-1,5-pentanediamine, tetramethyl-1,10-decanediamine, etc.;
aminoethers such as N-methyl morpholine, 6-(dimethylamino)-hexyl methyl ether, etc.; and
amine oxides such as N,N,N',N'-tetramethyl-1,6-hexanediamine dioxide, triethylenediamine dioxide, etc.

The chelating type of complexing agent may be sparteine, an N,N'-di-($C_1$-$C_4$ alkyl) bispidin, tris-2 (dimethylaminoethyl)-amine as well as those compounds falling within the scope of the following general formulas:

(I)
$$(R)_a-\underset{(H)_b}{\overset{(O)_d}{Y}}-Z-\left[\underset{(R)_b}{\overset{(O)_d}{Y'}}-Z\right]_c-\underset{(H)_b}{\overset{(O)_d}{Y'}}-(R)_a$$

(II)
$$\underset{CH_2}{(CH_2)_e}\overset{CH_2}{\underset{CH_2}{\diagdown}}N-Z-N\overset{CH_2}{\underset{CH_2}{\diagup}}(CH_2)_e$$

(III)
$$(H)_b-\underset{}{\overset{(O)_d}{Y}}-(R)_a$$
$$(H)_b-\underset{(R)_a}{\overset{(O)_d}{Y'}}-\boxed{S}-\underset{(R)_a}{\overset{(O)_d}{Y'}}-(H)_b$$

(IV)
$$\underset{(R')_b}{\overset{(R')_b \; (O)_d}{Y}}\diagdown Y \diagup (O)_d$$
(structure with Y atoms bearing $(R')_b$ and $(O)_d$ groups)

wherein $a$ is 1 or 2, depending on the valence of Y or Y'; $b$ is 0 or 1, depending on the valence of Y or Y'; $c$ is an integer of 0 to 10,000, inclusive; $d$ is 0, 1 or 2, depending on the valence of Y or Y'; $e$ is an integer of 0 to 3, inclusive; R is the same or different $C_1$-$C_4$ alkyl radical; R' is hydrogen when $d$ is 0 or is the same or different $C_1$-$C_4$ alkyl radical or $C_6$-$C_{10}$ aryl or aralkyl radical when $d$ is 0, 1 or 2; Y is a nitrogen, sulfur or phosphorus atom; Y' is a nitrogen, oxygen, sulfur or phosphorus atom; and Z is a nonreactive radical selected from the group consisting of (1) $C_4$-$C_{10}$ cycloaliphatic or aromatic radicals and their lower alkyl derivatives wherein said radicals are attached to the Y and Y' atoms in Formula I and the nitrogen atoms in Formula II at 1,2-positions on the aromatic rings or 1,2- or 1,3-positions on the cycloaliphatic rings; and (2) 1 to 4 methylenic radicals, wherein each methylenic radical contains 0 to 2 monovalent hydrocarbon radicals of 1 to 6 carbon atoms.

Preferably, the chelating Lewis base has (a) at least one Y being nitrogen and at least one Y' being oxygen (i.e. an aminoether) or (b) all the Y and Y' atoms being the same atom (i.e. polyamines, polyamine oxides, polyphosphines, polyphosphine oxides, polythioethers, polysulfones and polysulfoxides). It should be understood that the prefix "poly-" employed in describing the non-chelating and chelating Lewis bases means that the Lewis base is a monomer or a polymer in the classical sense and that such monomer or polymer has two or more of the same functionalities.

Suitable nonlimiting examples of chelating Lewis bases falling within the scope of the above formulas are:

Formula I (where all heteroatoms are nitrogen atoms).

N,N,N',N'-tetramethyl-1,2-cyclopentanediamine,
N,N,N',N'-tetramethyl-1,2-cyclohexanediamine (cis, trans or mixtures),
N,N,N',N'-tetramethyl-o-phenylenediamine,
4-ethyl-N,N,N',N'-tetramethyl-o-phenylenediamine,
N,N,N'',N''-tetramethyl-N'-phenyl diethylenetriamine,
N,N,N',N'-tetramethyl-1,2-ethanediamine,
N,N,N',N'-tetramethyl-1,3-propanediamine,
N,N,N',N'',N''-pentamethyl-diethylenetriamine,
N,N,N',N'-tetramethyl-1,2-propanediamine,
N,N'-dimethyl-N,N'-diethyl-1,2-ethanediamine,
N,N,N',N'-tetramethyl-1-cyclohexyl-1,2-ethanediamine,
N,N,N',N'-tetramethyl-2,3-butanediamine,
N,N,N',N'-tetramethyl-1,4-butanediamine,
N,N,N',N'',N''',N'''-hexamethyltriethylenetetramine,
poly-(N-ethyl-ethyleneimine),
poly-(N-methyl ethyleneimine),
N,N,N',N'-1,8-naphthylenediamine,
beta-(dimethylamino)-ethyl methyl ether,
beta-diethylaminoethyl ethyl ether,
bis-β-(dimethylaminoethyl) ether,
beta-(dimethylamino)-ethyl ethyl ether,
gamma-(dimethylamino)-propyl methyl ether,
ortho-dimethylamino anisole,
1-dimethylamino-2-dimethylphosphino ethane,
bis-(beta-dimethylaminoethyl) methyl phosphine,
beta-(dimethylaminoethyl) methyl sulfide,
1,2-dipiperidylethane,
tris-(1,3,5-dimethylamino) cyclohexane,
N,N',N''-trimethyl-1,3,5-hexahydrotriazine,
tetrabutylethylenediamine dioxide,
tetramethylmethanediamine monoxide,
tetramethylethylenediphosphine dioxide,
2,5-dithiahexane-2,5-disulfone, and
2,5-dithiahexane-2,5-disulfoxide, etc.

The chelating type of complexing agent is preferred over the non-chelating type of chelating agent since the former results in more stable complexed inorganic lithium salts. Particularly preferred, since they generally give rise to hydrocarbon-soluble complexes, are those chelating Lewis bases which are (1) tertiary polyamines (i.e. all of the heteroatoms are tertiary nitrogen atoms) containing at least 5 carbon atoms and at least 2 tertiary nitrogen atoms and (2) tertiary aminoethers (i.e. all nitrogen atoms present are tertiary nitrogen atoms) containing at least 5 carbon atoms and at least 1 tertiary nitrogen atom and at least one ether group. Particularly preferred species of the chelating tertiary polyamines are N,N,N',N'-tetramethyl-1,2-ethanediamine,
N,N,N',N'-tetramethyl-1,3-propanediamine,
N,N,N',N'-tetramethyl-1,2-cyclohexanediamine (cis, trans or mixtures),
N,N,N',N'',N''-pentamethyldiethylenetriamine,
N,N,N',N'',N''',N'''-hexamethyltriethylenetetramine,
poly-(N-methyl ethyleneimine), etc.

Particularly preferred species of the tertiary aminoethers is beta-(dimethylamino)-ethyl methyl ether.

The most particularly preferred species are pentamethyldiethylenetriamine and hexamethyltriethylenetetramine, tris - ($\beta$ - dimethylaminoethyl)amine and combinations thereof.

The complex of the inorganic lithium salt (with the non-chelating or chelating complexing agent) may be readily prepared by mixing the selected inorganic lithium salt (having the requisite maximum lattice energy) with the selected complexing agent in the absence of solvent. Such mixing may also be accomplished in the presence of inert hydrocarbons, e.g. $C_4$–$C_{20}$ alkanes (e.g. pentane, heptane, hexadecane); $C_6$–$C_{20}$ aromatics (e.g. benzene, toluene, xylene, dibutylnaphthalene); halogenated aromatics (e.g. chlorobenzene, dichlorobenzene, hexafluorobenzene); heterocyclic compounds (e.g. pyridine, pyrrole, furan, thiophene, sulfolane, borazole); polar solvents (e.g. alcohols, ketones, dimethylsulfoxide, acetonitrile dimethylformamide, liquid ammonia, triethylamine, propylene carbonate, ethers, etc.); or mixtures thereof.

The amount of the diluent is not critical and amounts in the range of 0 to 99.9 wt. percent, based on the chelated lithium salt may be conveniently employed. Thus, the complex can be prepared in the absence of solvents, in the form of pastes and in solutions.

In those situations where the inorganic lithium salt of choice is not solubilized by the admixture of the complexing agent and solvent, the complex may be formed by mixing the inorganic lithium salt (which is preferably in finely divided form) with the complexing agent of choice in stoichiometric amounts, or preferably, with excess complexing agent.

Another method for preparing the complex involves anion exchange. In this method, the complexing agent of choice is mixed with an inorganic lithium salt (in which the anion is not the desired anion) by one of the methods described above. Thereafter the resultant complex is subjected to anion exchange in the presence of a metal salt (or other well known techniques such as anion exchange resins) containing the anion of choice; alternatively, all components may be mixed simultaneously and both complexation and metathesis occurs in situ.

Another method for preparing the complex is analogous to the preceding method except that here the anion is one of choice, but the complexing agent is not one of choice. After preparing the non-preferred complex by one of the above methods, the non-preferred complexing agent moiety is exchanged for the preferred complexing agent moiety by mixing the complex (utilizing one of the former methods) with the desired complexing agent and thereafter recovering the desired complex.

Regardless of the method employed the preparation of the complex is preferably carried out under anhydrous conditions.

The complex may be readily prepared at temperatures of about —50° C. to about 200° C.; preferably 0 to 100° C.; the latter temperature range is preferred because of convenience and also since higher temperatures favor dissociation of the less stable complexes. In general, from 0.25 to 50, preferably 0.5 to 10, moles of complexing agent per mole of inorganic lithium salt is employed; the complexing agent may also be employed as a solvent However, it should be understood that the amount of complexing agent employed may influence the structure of the resultant complex. Thus, it has been found possible to prepare complexes of the following types:

(1) Two moles of inorganic lithium salt to one mole of complexing agent such as $(LiBr)_2$•hexamethyltriethylenetetramine.

(2) One mole of inorganic lithium salt to one mole of complexing agent, such as LiBr•pentamethyldiethylenetriamine, LiI•tetramethylenethanediamine.

(3) One mole of inorganic lithium salt to two moles of complexing agent, such as $LiAlH_4$•2(tetramethylethanediamine), $LiAlH_4$•2(tetramethyl methanediamine), LiBr•2(tetramethylethanediamine).

Of course, the minimum amount of complexing agent should be that stoichiometric amount required to produce the desired type of complex (where more than one type of complex is possible from a particular inorganic lithium salt and a particular complexing agent). Where only one type of complex can be formed or where one is not concerned with the particular type of complex to be formed (assuming more than one type is possible), it is desirable to employ amounts of complexing agent in excess of the stoichiometric amount.

Although we do not wish to be bound by the following theoretical structure, it is believed that the 1:1 complex made using a tridentate chelating agent has a structure of the type represented by lithium chloride and N,N,N',N'', N''-pentamethyl diethylenetriamine:

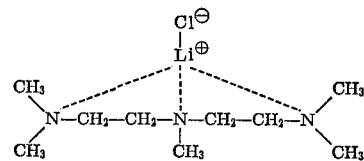

Regardless of the number of functional groups in the chelating complexing agent, the number of functional groups solvating the lithium at one time will rarely exceed four and will usually be three. Of course, the bidentate chelating agents can have only two functional groups solvating the lithium.

The complexes of this invention can be utilized either in their molten state or dissolved in a solvent. Preferably, because of temperature requirements, the complexes are dissolved in a solvent. The preferred solvents are aromatic in nature and include benzene, alkylbenzenes, halobenzenes, pyridine, alkyl substituted pyridines, pyrrole, naphthalene, alkyl naphthalenes, indenes, and combinations thereof. Of this group single ring aromatic solvents are preferred.

The most preferred solvents for use in this invention are benzene and toluene.

Specific, nonlimiting examples of the solvents which may be utilized are benzene, toluene, xylene, chlorobenzene, nitrobenzene, ethylbenzene, pyridine, pyrrole, quinoline, hexafluorobenzene, fluorobenzene, styrene.

The electric batteries of this invention can be utilized as either primary or secondary electrical energy storage devices. When a primary battery is desired, the cathodes are preferably selected from the group consisting of $H_2$, $O_2$, $Cl_2$, Ag-AgI, Ag-AgCl and Ag-AgBr. The most preferred material for use as the anodic electrode is lithium due to its high energy density.

In a secondary battery, the electrodes are preferably selected from the group consisting of Li, Fe, Co, Ni, Cu, Zn, Cd, Bi, Pb, Hg, Al, Mg, Ag, Au, Pt, Pd, Rh, Sn, Sb, carbon, and alloys of the aforesaid metals.

As stated previously, the charge transfer agent of the instant invention can be effectively utilized in a solventless, molten state. It is well known that molten alkali metal salts, such as lithium iodide in the molten state, are useful as electrical conductors. However, the use of such molten salts entails special equipment and procedures since they have high melting points, e.g. LiI melts at 450° C. and LiBr melts at 547° C. However, this disadvantage can be readily overcome by complexing the lithium salt with a complexing agent such as N,N,N',N'',N''-pentamethyldiethylenetriamine (PMDT). Crystalline LiI•PMDT complex starts to melt at about 84° C. and is completely molten at about 110° C. At 110° C., PMDT•LiBr is molten and has a conductivity of $5.2 \times 10^{-4}$ (ohm-cm.)$^{-1}$. Some lithium salts, such as lithium aluminum hydride, decompose below their melting points but complexation can extend their utility. For example, LiAlH$_4$ decomposes at 110–125° C., whereas PMDT•LiAlH$_4$ melts without decomposition at 150–155° C. and can be sublimed without decomposition at 125° C./0.5 mm. When complexed by HMTT, LiAlH$_4$ is stable to over 200° C.

The following examples are for illustration and not intended to limit the scope of the instant invention.

EXAMPLE 1

A secondary battery was formed by containing in a closed glass vessel two parallel electrodes each having an effective area of about cm.$^2$ and separated from each other by 0.1 cm. The vessel contained about 25 ml. of a 2 molar solution of pentamethyldiethylenetriamine (PMDT)•LiBr chelate in benzene. The AC conductivity of this system was $2.9 \times 10^{-4}$ (ohm-cm.)$^{-1}$. This assembly was subjected to a polarizing voltage of 3.5 volts for one hour. During this time a current of about $1.5 \times 10^{-3}$ amps passed through the system which charged or polarized the electrodes. When the applied voltage was removed and the open circuit potential of the cell was read by connecting an electronic voltmeter to the two electrodes, an EMF of 2.6 volts was observed. The cell was then allowed to discharge across a 10,000 ohm resistor for six hours. During this time the current delivered by the cell dropped from $2 \times 10^{-4}$ to $6 \times 10^{-6}$ amperes and the open voltage dropped to 0.06 volt. The charging process was repeated and the cell reached an open voltage of 2.3 volts. The same discharge pattern was followed with quite reproducible results. The discharged cells conductivity was measured three days after the end of the discharge and found to be still $2.9 \times 10^{-4}$ (ohm-cm.)$^{-1}$. This charging and discharging process could be repeated several times without adverse effects.

EAXMPLE 2

In the same system described in the preceding example PMDT•LiI was used as a 1.7 molar solution in benzene and the open voltage of the cell was found to be 1.9 volts. Again several charging and discharging cycles were made. At the end of these cycles, the AC conductivity of the system was, within experimental error, the same as at the start: $8 \times 10^{-4}$ (ohm-cm.)$^{-1}$.

EXAMPLE 3

In the same system described in Example 2, the solvent was ortho-dichlorobenzene instead of benzene, the PMDT•LiI was 2 molar and the open voltage was 2.9 volts. Charging and discharging of the system repeatedly was found feasible and the conductivity remained unchanged at $6.8 \times 10^{-4}$ (ohm-cm.)$^{-1}$.

EXAMPLE 4

In the same system as described above, a 1.5 molar solution of PMDT•LiI in indene was examined. The open voltage was 2.2 volts. After several discharging and recharging cycles the system had the same conductivity as at the start: $9 \times 10^{-5}$ (ohm-cm.)$^{-1}$.

EXAMPLE 5

In the same physical set-up as described in Example 1, a 1 molar solution of LiAlH$_4$•hexamethyltriethylenetetramine (HMTT) in benzene was charged and the open voltage was 0.45 volt. After repeated charging and discharging the conductivity of the system was $1.1 \times 10^{-3}$ (ohm-cm.)$^{-1}$, the same as at the start of the experiment.

EXAMPLE 6

Instead of chel•LiAlH$_4$, 2 molar HMTT•LiBH$_4$ in benzene was used. The open voltage was 1.1 volts and the conductivity after repeated charging and discharging was still $4.4 \times 10^{-4}$ (ohm-cm.)$^{-1}$ as at the start of the experiment.

EXAMPLE 7

Conductivity of LiBr and LiBF$_4$ chelates in dipolar aprotic solvents

Conductivity measurements were made of the following systems, utilizing the apparatus and procedure of Example 1. It was noted that the complex salts of this invention yield conductivities similar to the uncomplexed salt in propylene carbonate and dimethylformamide indicating that the use of the complex salts of the instant invention with solvents of this class yields no advantage. This phenomenon can be compared with the behavior of the complex salts in benzene wherein the uncomplexed salts yield conductivities on the order of from $10^{-10}$ to $10^{-13}$ (ohm-cm.)$^{-1}$.

TABLE I

| Chelate a, b | Solvent | Conductivity (ohm-cm.)c$_i$ |
|---|---|---|
| TMED•LiBr | Propylene carbonate | $1.8 \times 10^{-3}$ |
| PMDT•LiBr | do | $2.5 \times 10^{-3}$ |
| HMTT•LiBr | do | $2.8 \times 10^{-3}$ |
| PMDT•LiBF$_4$ | do | $2.9 \times 10^{-3}$ |
| HMTT•LiBF$_4$ | do | $3.3 \times 10^{-3}$ |
| LiBr | do | $1.8 \times 10^{-3}$ |
| LiBF$_4$ | do | $2.6 \times 10^{-3}$ |
| TMED•LiBr | Hexamethylphosphoramide | $1.6 \times 10^{-3}$ |
| PMDT•LiBr | do | $1.3 \times 10^{-3}$ |
| HMTT•LiBr (s) | do | $8.5 \times 10^{-4}$ |
| TMED•LiBF$_4$ | Dimethylformamide | $5 \times 10^{-3}$ |
| PMDT•LiBF$_4$ | do | $5 \times 10^{-3}$ |
| iso-HMTT•LiBF$_4$ | do | $5 \times 10^{-3}$ |
| TMED•LiBr (s) | do | $5 \times 10^{-3}$ |
| HMTT•LiBr | do | $4.8 \times 10^{-3}$ |
| iso-HMTT•LiBr (s) | do | $4.3 \times 10^{-3}$ |
| PMDT•LiBr | do | $4.2 \times 10^{-3}$ |
| LiBr | do | $5.3 \times 10^{-6}$ | a All solutions were 1 molar in chelate unless followed by (s) in which case they were saturated and the concentrations were less than 1 molar.
b TMED=Me$_2$NCH$_2$CH$_2$NMe$_2$, PMDT=Me$_2$NCH$_2$CH$_2$N(Me)CH$_2$CH$_2$NMe$_2$, HMTT=Me$_2$NCH$_2$CH$_2$—[N(Me)CH$_2$CH$_2$]$_2$NMe$_2$, iso-HMTT=N(CH$_2$CH$_2$NMe$_2$)$_3$.

EXAMPLE 8

Conductivity of LiBr and LiBF$_4$ chelates in substituted and heterocyclic aromatic solvents Table II records conductivity measurements made utilizing the apparatus and procedure of Example 1 for the complex salts in chlorobenzene, fluorobenzene, m-dichlorobenzene and pyridine. These data demonstrate that aromatic solvents of these types may be used with the complex salts of the instant invention as a charge transfer medium to prepare an electric battery cell.

TABLE II

| Chelate/ | Solvent | Conductivity (ohm-cm.)$^{-1}$ |
|---|---|---|
| HMTT•LiBF$_4$ (s) | Chlorobenzene | 1.4×10$^{-3}$ |
| HMTT•LiBr (s) | do | 5×10$^{-4}$ |
| PMDT•LiBr | do | 1.9×10$^{-4}$ |
| PMDT•LiBF$_4$ (s) | do | 5.3×10$^{-5}$ |
| TMED•LiBF$_4$ (s) | do | 1.1=10$^{-6}$ |
| TMED•LiBr (s) | do | 7.4×10$^{-8}$ |
| iso-HMTT•LiBr | Fluorobenzene | 6.5×10$^{-4}$ |
| PMDT•LiBr | do | 2.6×10$^{-4}$ |
| TMED•LiBr | do | 7×10$^{-5}$ |
| iso-HMTT•LiBr (s) | m-Dichlorobenzene | 4.3×10$^{-4}$ |
| PMDT•LiBr (s) | do | 1.5×10$^{-5}$ |
| TMED•LiBr (s) | do | 1.4×10$^{-7}$ |
| HMTT•LiBF$_4$ | Pyridine | 3.1×10$^{-3}$ |
| PMDT•LiBF$_4$ | do | 2.5×10$^{-3}$ |
| TMED•LiBF$_4$ | do | 2.3×10$^{-3}$ |
| HMTT•LiBr | do | 1.5×10$^{-3}$ |
| iso-HMTT•LiBr | do | 1.2×10$^{-3}$ |
| PMDT•LiBr (s) | do | 1.0×10$^{-3}$ | a All solutions were 1 molar in chelate unless followed by (s) in which case they were saturated and the concentrations were less than 1 molar

EXAMPLE 9

Using the apparatus and procedures of Example 1, the conductivity of a 0.9 molar solution of pentamethyldiethylenetriamine•LiBr in hexafluorobenzene was measured. The conductivity in ohm-cm.)$^{-1}$ was 2.62×10$^{-5}$ at 25° C., 3.7×10$^{-5}$ at 50° C. and 4.05×10$^{-5}$ at 75° C. using a frequency of 60 Hz.

What is claimed is:

1. In an electric battery cell, the combination of electrodes with a charge transfer agent comprising an inorganic lithium salt having a lattice energy of not more than about 210 kilocalories per mole at 18° C. complexed with a monomeric or polymeric polyfunctional chelating tertiary amine containing at least two nitrogen atoms.

2. In an electric battery cell defined in claim 1, the charge transfer agent being dissolved in an aromatic solvent.

3. In an electric battery cell defined in claim 2, the inorganic lithium salt being selected from the group consisting of LiBr, LiI, LiBH$_4$, LiAlH$_4$, LiBF$_4$ and combinations thereof.

4. In an electric battery cell defined in claim 2, the polyfunctional chelating tertiary amine being selected from the group consisting of pentamethyldiethylene triamine, hexamethyltriethylenetetramine and tris-(β-dimethylaminomethyl) amine and combinations thereof.

5. In an electric battery cell defined in claim 2, the ratio of complexing agent to inorganic lithium salt varying from about 0.5 to about 2.5.

6. In an electric battery cell defined in claim 2, the aromatic solvent being selected from the group consisting of benzene, alkylbenzene, halobenzenes, pyridine, pyrrole, naphthalene, alkyl naphthalenes, halonaphthalenes, indene and combinations thereof.

7. In an electric battery cell as defined by claim 2, the electrodes being selected from the group consisting of Li, H$_2$, O$_2$, Cl$_2$, Ag-AgI, Ag-AgCl and Ag-AgBr electrodes.

8. An electric battery cell as defined by claim 1, in which one of the electrodes serving as a cathode on discharge being unreactive solid material, said cell being polarized by application of polarizing voltage which reverses discharge reactions in the cell.

9. In an electric battery cell as defined by claim 8, the electrodes being selected from the group consisting of Li, Fe, Co, Ni, Cu, Zn, Cd, Bi, Pb, Hg, Al, Mg, Ag, Au, Pt, Pd, Rh, Sn, Sb, C and alloys thereof.

10. In an electric battery cell as defined by claim 9, the aromatic solvent being selected from the group consisting of benzene, indene, dichlorobenzenes, monochlorobenzene, fluorobenzene, pyridine, toluene, xylene and hexafluorobenzene.

11. In an electric battery cell as defined by claim 9, the inorganic lithium salt being selected from the group consisting of LiBr, LiI, LiBH$_4$, LiAlH$_4$, LiBF$_4$ and combinations thereof.

12. In an electric battery cell as defined by claim 9, the polyfunctional chelating tertiary amine being selected from the group consisting of pentamethyldiethylenetriamine, hexamethyltriethylenetetramine and tris-(β-dimethylaminoethyl)amine and combinations thereof.

13. In an electric battery cell as defined by claim 9, the ratio of complexing agent to inorganic lithium salt varying from about 0.5 to about 2.5.

14. In an electric battery as defined in claim 9, wherein said inorganic lithium salt is selected from the group consisting of LiBr, LiI, LiBH$_4$, LiAlH$_4$, LiBF$_4$ and combinations thereof, and said polyfunctional chelating tertiary amine is selected from the group consisting of pentamethyldiethylenetriamine, hexamethyltriethylenetetramine, tris(β-dimethylaminoethyl)amine and combinations thereof.

15. In an electric battery as defined in claim 1 a chelating tertiary amine being selected from the group consisting of compounds represented by the following general formulas:

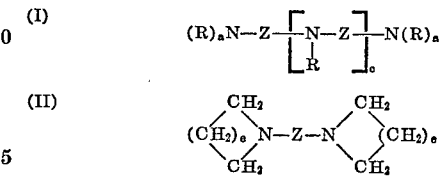

wherein Z is a nonreactive radical selected from the group consisting of (1) C$_4$ to C$_{10}$ cycloaliphatic or aromatic radicals and their lower alkyl derivatives, wherein said radicals are attached to the nitrogen atoms at 1, 2 positions on the aromatic ring or 1,2 positions or 1,3 positions on cycloaliphatic rings, and (2) 1 to 4 methylenic radicals, wherein each methylenic radical contains 0 to 2 monovalent hydrocarbon radicals of 1 to 6 carbon atoms; R is a C$_1$ to C$_4$ alkyl radical; $a$ is 2, $c$ is an integer of from 0 to 10,000, $e$ is an integer of from 0 to 3, sparteine, and N,N'-di-(C$_1$–C$_4$ alkyl) bispidin, and tris-2-(dimethylaminoethyl)amine.

16. In an electric battery as defined in claim 15 the lithium salt being selected from the group consisting of lithium chloride, lithium bromide, lithium iodide, lithium aluminum hydride, lithium borohydride, lithium nitrate, lithium nitrite, lithium hexafluorophosphate, lithium tetrafluoroborate, lithium tetraphenylborate, LiAl(C$_2$H$_5$)H$_3$, LiAl(C$_2$H$_5$)$_2$H$_2$, LiAl(C$_2$H$_5$)$_3$H, LiAl(C$_2$H$_5$)$_4$, lithium perchlorate, lithium azide, LiAsF$_6$, and Li$_2$BeF$_4$.

References Cited
UNITED STATES PATENTS

| 3,073,884 | 1/1963 | Pinkerton | 136—137 |
| 3,110,630 | 11/1963 | Wolfe | 136—154 |
| 3,404,042 | 10/1968 | Forster et al. | 136—6 |
| 3,542,602 | 11/1970 | Gabano | 136—155 |
| 3,578,500 | 5/1971 | Maricle et al. | 136—154 |

DONALD L. WALTON, Primary Examiner

U.S. Cl. X.R.

136—83 R, 137, 154

UNITED STATES PATENT OFFICE
CERTIFICATE OF CORRECTION

Patent No. 3,764,385  Dated October 9, 1973

Inventor(s) Arthur W. Langer, Jr. and Thomas A. Whitney

It is certified that error appears in the above-identified patent and that said Letters Patent are hereby corrected as shown below:

Column 3, line 27, change "and $R-\overset{\overset{O}{\|}}{\underset{R}{N}}-R$" to -- and $R-\overset{\overset{O}{\|}}{\underset{R}{P}}-R$ --.

Column 7, line 36, after "about" insert -- 10 --; line 61, change "EAXMPLE" to -- EXAMPLE --.

Column 8, Example 7, Table 1, line 45, last column, change "(ohm-cm.)$C_1$" to -- (ohm-cm.)$^{-1}$ --; line 62, change "$N(CH_2CH_2NMe_2)3$" to -- $N(CH_2CH_2NMe_2)_3$ --.

Column 9, line 27, change "in ohm-cm.)$^{-1}$" to -- in (ohm-cm.)$^{-1}$ --; line 49, change "methylaminomethyl)" to -- methylaminoethyl) --.

Signed and sealed this 9th day of April 1974.

(SEAL)
Attest:

EDWARD M. FLETCHER, JR.
Attesting Officer

C. MARSHALL DANN
Commissioner of Patents